(No Model.)
E. THOMSON.
METHOD OF WORKING METALS BY ELECTRICITY.
No. 432,651. Patented July 22, 1890.
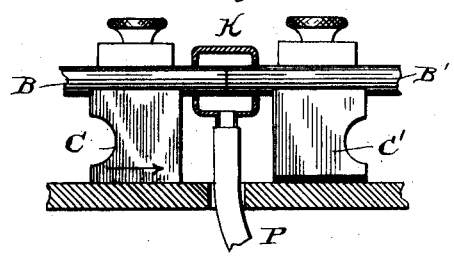
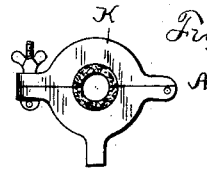
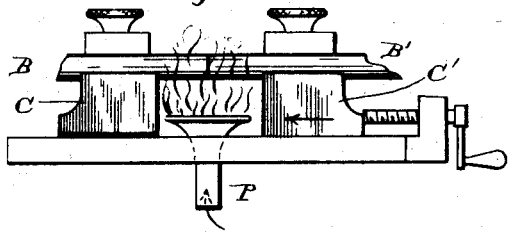
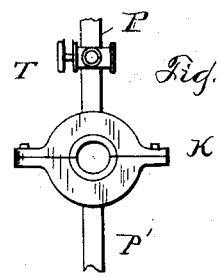
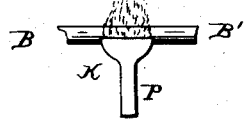
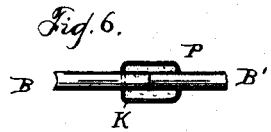
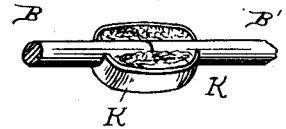
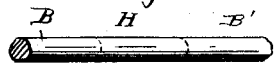
WITNESSES:
Ira P. Steward.
Wm H. Capel
INVENTOR
Elihu Thomson
BY
Townsend & MacArthur
ATTORNEYS.

UNITED STATES PATENT OFFICE.

ELIHU THOMSON, OF LYNN, MASSACHUSETTS, ASSIGNOR TO THE THOMSON ELECTRIC WELDING COMPANY, OF MAINE.

METHOD OF WORKING METALS BY ELECTRICITY.

SPECIFICATION forming part of Letters Patent No. 432,651, dated July 22, 1890.

Application filed May 17, 1888. Serial No. 274,193. (No model.)

*To all whom it may concern:*

Be it known that I, ELIHU THOMSON, a citizen of the United States, and a resident of Lynn, in the county of Essex and State of Massachusetts, have invented a certain new and useful Improvement in Electric Working of Metals, of which the following is a specification.

My invention relates to the art of metal-working generally; and it consists in an improved art which comprises, essentially, the heating of the metal object electrically by the passage of a current of large volume and the application to the object while so heated of a surrounding envelope (gaseous fluid or solid) for the purpose of changing or preventing change in the quality of the material, according to the special end to be attained. The treatment of the metal object by the application of the heating substance and while electrically heated may take place simultaneously with the application of electric welding, forging, or otherwise shaping the material, or may take place independently of such operation, and the treating substance applied to the part of the object contained between conducting-clamps and locally heated by the current passing from one clamp to the other may be of any kind, depending upon the special object sought.

My invention is applicable not only to those cases where it is desirable to prevent oxidation or change of character in the surface of the metal object which is heated in the welding, forging, or shaping operation, but is also applicable to producing an addition to or modification in the character of the surfaces of a metal object or portion of object, either independently of or simultaneously with the forging, shaping, or other working operation performed upon the metal. Thus, for instance, my invention is applicable to the local hardening of parts of steel bars and the local case-hardening of iron bars or mild steel bars or other objects when heated by the passage of an electric current for the purpose of welding, forging, shaping, or other working.

In carrying out my invention the object to be treated is made a portion of an electric circuit carrying a current of large volume, as by clamping it in suitable conducting clamps— such, for instance, as described in my prior patents, Nos. 347,140 and 347,141—and while still heated by the current and while the heat is still under control is surrounded by an envelope or covering of the substance required for affecting the surface of the material or preventing change therein. To prevent oxidation, I surround iron or steel bars with a hydrocarbon gas or other gas containing no oxygen, such as hydrogen or nitrogen. To chill and harden steel, I suddenly surround the heated bars with cooling-fluid, such as water or oil. To case-harden, I surround the bar with a layer of case-hardening flux—such as cyanide of potassium, yellow prussiate of potash, shavings of horn, animal charcoal, leather cuttings, and carbonate of potash, or the like—and keep the pieces hot by the current until the required case-hardening is effected as a result of the addition of carbon to the surface layer of the material.

In the accompanying drawings, Figure 1 is a side elevation of an apparatus suitable for use in carrying out my invention. Fig. 2 shows in detail a part of the apparatus illustrated in Fig. 1. Fig. 3 illustrates a modification of my invention. Fig. 4 illustrates a means which may be employed for chilling surfaces heated during the passage of an electric current. Figs. 5 and 6 illustrate modifications. Fig. 7 shows a means which may be employed in case-hardening. Figs. 8 and 9 illustrate objects treated in accordance with my invention.

Referring to Fig. 1, C C' indicate the usual conducting-clamps of large mass, which are insulated from one another, and which are to be supplied with current of large volume by the means described in my prior patents before referred to or by any other desired means. The object or objects to be treated are fixed in the clamps, and are made to form a conducting-path from one clamp to the other, the part included between the clamps being that which becomes heated by the passage of the current from one clamp to the other. In the present case I have illustrated the application of my invention to two pieces of metal B B', between which a butt-weld is to be formed in accordance with my prior invention. Surrounding the part of the object or objects between the clamps is a suitable casing K, which envelops the part which is heated, and whose surface is to be treated or to be preserved from deterioration. The casing K is supplied, through a pipe P, with ordinary coal-gas or gasoline-vapor during the heating of the metal, so as to preserve the same from oxidation during the welding or like operation performed upon the object heated. Oxidizable metals are by this means thoroughly protected at their surface, and, in fact, with gases rich in carbon, will receive when highly heated a veritable protective layer of deposited carbon, which gradually carbonizes the surface of an iron bar while heated and steelifies or case-hardens it. The casing K can be constructed of sheet-iron or of other material and made in two parts hinged at A, as shown in Fig. 2. If of metal, it should not make electrical contact with the object treated, but should be guarded therefrom by mica, asbestus, or other suitable insulating and refractory material applied at the points where the object enters the casing. A clamp may be provided for securing the two halves of the casing tightly together.

A special treatment (illustrated in Fig. 3) involves a use of an inflammable gas supplied through the pipe P, which gas as it burns bathes the bars B B', or other object, at their locally heated portion, and accomplishes the same objects. The casing K is in this instance dispensed with.

In Fig. 4 the casing K is shown provided with an inlet-pipe P and an exit-pipe P'. This modification is useful when a circulation of gas or vapor is desired. The pipe P may be provided with a cock T to regulate the flow of the gas or liquid. This device may be used to suddenly envelop the heated portion of the material to be worked while the same is still in circuit between the clamps in a bath of water or other fluid let on by the cock from a supply-tank or other source. A bath of oil might be applied in the same way. This device is useful in the treatment of the object for chilling a steel or case-hardened surface. The cock T might control a connection from another source in addition, one source supplying water and the other supplying gas. By this means the heated object or portion of object in the circuit between the clamps may be first immersed while hot in a non-oxidizing gas or a carbureting gas, and then in a chilling-fluid—such as water or oil—which will chill the heated metal. After a local treatment of this kind the metal (iron or steel) will be found, on removal of the casing K, to have a bright surface at the part where it is welded or otherwise worked upon during heating. The current may be afterward again applied to draw the temper to any desired degree.

In some cases half of the casing K may be omitted, as indicated in Figs. 5 and 6, so that the operation may be observed. Similarly openings covered with mica may be provided in the sides of the casing K for a similar purpose.

In Fig. 7 the casing is shown in the form of a cup for holding a case-hardening material—such as cyanide of potassium or other material—in which the bar or bars or other objects are to be enveloped while hot and heated by the electric current passed through them from clamp to clamp.

Fig. 8 illustrates a bar B, which at its portion H is supposed to have been locally treated, so as to be carbureted, steelified, or case-hardened, the remaining portions of the bar being iron or mild steel. The treatment would consist simply in including the continuous bar between the clamps, so that its part H would be heated by the current passing from one to the other, and then applying the proper substance for the local treatment desired.

Fig. 9 indicates a shaft B, the portion H of which between the two collars, which portion may be used for a bearing running in a journal-box, has been case-hardened and chilled in accordance with my invention.

What I claim as my invention is—

1. The herein-described art of treating metal objects locally, consisting in heating the part to be treated by an electric current of large volume passed through the same and surrounding the object with the desired treating substance while the same is still heated by the current.

2. The herein-described improvement in metal-working, which consists in locally treating the object by surrounding the same with the desired treating material while the object is locally heated by the passage of an electric current of large volume.

3. The herein-described improvement in metal-working, which consists in surrounding the object locally with a deoxidizing and carbureting substance while the same is heated by an electric current of large volume passed through the same.

4. The herein-described improvement in tempering or hardening metal, which consists in passing a heating-current of electricity through the object while the same is surrounded by a protective atmosphere, and then passing a chilling-fluid over the object, as and for the purpose described.

5. The herein-described improvement in metal-working, which consists in heating the object locally by passing a current of large volume through the same and simultaneously enveloping the part treated in a protective atmosphere.

6. The herein-described method of locally tempering or hardening metals, which consists in including the part to be treated in a heating electric circuit while surrounded by a protective envelope, passing a chilling substance over the heated surface, and then reheating by the electric current, as and for the purpose described.

7. The herein-described improvement in working metals locally, which consists in clamping the object between suitable conducting-clamps, passing a heavy electric current through the object from clamp to clamp to heat the object, and surrounding the object at a part between the clamps, and while still heated, with a treating envelope or covering, as and for the purpose described.

8. The herein-described improvement in electric welding, forging, &c., which consists in surrounding the work at the part between the clamps with an inert protective envelope, preferably gaseous, adapted to protect the work from oxidation.

9. The herein-described process of locally case-hardening or otherwise treating a continuous bar, rod, or other structure of metal, which consists in including the part of the object to be treated in an electric circuit between two conducting clamps or abutments, passing through such part of the object a heavy current of electricity, so as to heat the same, and then subjecting the locally-heated portion to the desired treatment.

10. The herein-described method of producing an object with a locally case-hardened, chilled, tempered, or otherwise modified section, consisting in passing a heavy heating electric current through the portion whose character is to be modified and applying the necessary local treatment while the object remains in the circuit.

Signed at Lynn, in the county of Essex and State of Massachusetts, this 14th day of May, A. D. 1888.

ELIHU THOMSON.

Witnesses:
J. W. GIBBONEY,
F. R. HILL.